Aug. 2, 1938.    G. E. FRANCK    2,125,554
LINE VALVE
Filed Aug. 17, 1936

George E. Franck
INVENTOR.

Patented Aug. 2, 1938

2,125,554

UNITED STATES PATENT OFFICE 2,125,554

LINE VALVE

George E. Franck, Berwyn, Ill., assignor to The Imperial Brass Manufacturing Company, Chicago, Ill.

Application August 17, 1936, Serial No. 96,426

12 Claims. (Cl. 251—3)

My invention relates to valves and particularly to shut-off valves for fluid lines. The object of my invention, therefore, is the provision of a new and improved valve device for fluid lines.

Another object of my invention is the provision of a new and improved valve device which will provide a streamline passage for the fluid.

An object is also the provision of a novel device so constructed that there is a passage for fluid through the valve and the valve stem.

Still another object is to provide a valve device in which the moving parts including the valve member itself are directly connected to the fluid line.

A further object is to provide a new and improved valve device which is operated axially by reason of the manual rotation of a handle and which is provided with means for making a seal in the open position to insure the device against leakage.

A further object is a new and improved valve device having a handle swivelly connected to the device and operable when rotated to translate the valve member axially to off and on positions.

An added object is the provision in the device of an improved valve in the form of a cap fitting loosely over the valve stem so that the valve will be permitted to find its own seat when closed.

A further object is to provide a line valve device for fluid lines wherein all of the parts are in straight line relation and concentric with the fluid line itself.

A still further object of my invention is to provide a line valve device in which the fluid passes directly through the valve member and stem, said stem being itself connected to the fluid line, the valve device being operable to open and close as a result of axial movement of the valve produced by rotation of a concentric handle wheel.

Another object is the provision of a line valve device for a fluid line having a valve member attached directly to the fluid line and having a passage through it for the fluid, the valve movable axially into open and closed position by rotation of a handle wheel, the valve member additionally operable to form in the open position a reverse seal against the accidental leakage of fluid.

Further objects and advantages of my invention will become apparent as the description proceeds, taken in connection with the accompanying drawing which forms a part of this specification.

Figure 1:
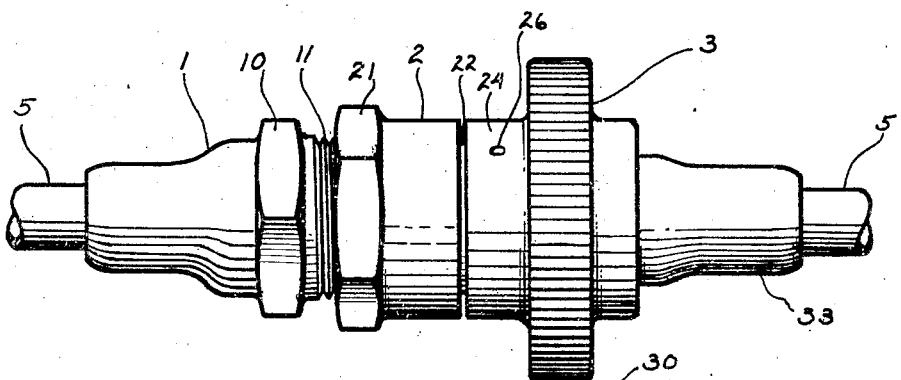
Fig. 1 is a longitudinal elevation of the preferred form of my device.
Figure 2:
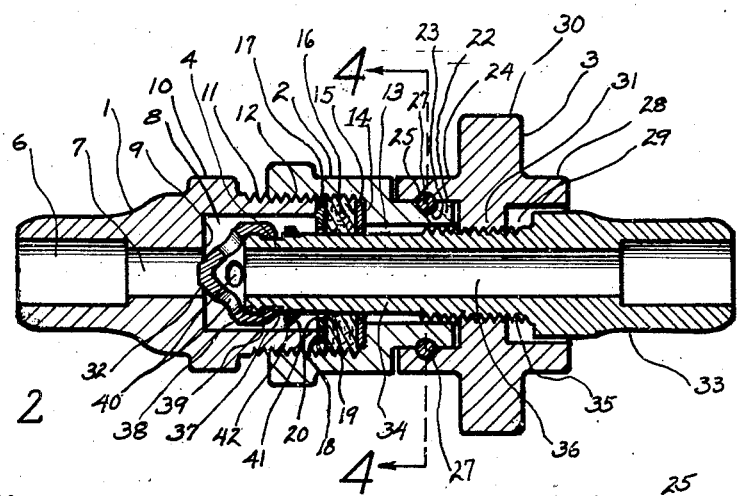
Fig. 2 is a longitudinal section of the valve device.
Figure 3:
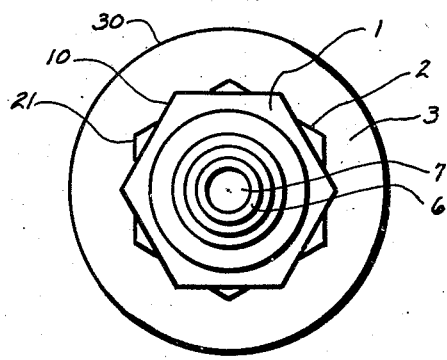
Fig. 3 is an end view.
Figure 4:
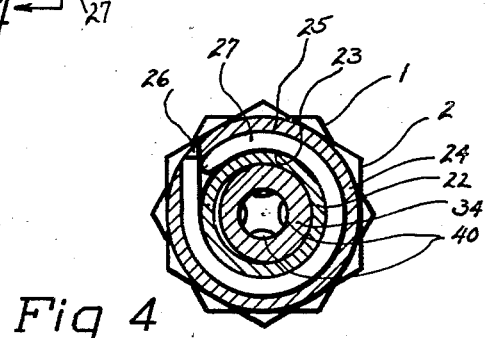
Fig. 4 is a cross section at 4—4 of Fig. 2.

For the purpose of disclosure, I have illustrated in the drawing and shall hereinafter describe in detail the preferred embodiment of my invention with the understanding that I do not intend to limit my invention to the particular construction and arrangement shown, it being contemplated that various changes may be made by those skilled in the art without departing from the spirit and scope of the appended claims.

In fluid lines of various sorts and particularly in refrigeration lines it is frequently advisable to remove from the line a compressor, an evaporator or other device without the necessity of completely emptying the refrigerant from the system. To accomplish this numerous valves would have to be inserted at various parts of the line wherever a removable unit might be. Although there are varieties of valves in general use they are for the most part bulky and too expensive to allow many of them to be placed in each and every likely position in the line. Furthermore, refrigeration valves, which must meet rigid specifications, are invariably designed to be secured to a beam, wall or other support and cannot be conveniently used unsupported in a line. Most objectionable, moreover, from the standpoint of putting a great many valves in any one line is the fact that the flow of fluid through the average valve is in a tortuous path and has a marked tendency to lower the efficiency of the system. A novel feature of the present invention is a valve of streamline construction offering a minimum of restriction to the flow of fluid. It is small and compact, and needs no support other than the fluid line itself. The valve is sufficiently simple and inexpensive so that any desired number of them may be used in a fluid line but it is especially due to the novel streamline construction that when many of these valves are placed in a system they do not measurably lower the efficiency.

As shown in the drawing, my invention consists of a valve device in which a body portion consisting of a connecting element 1 and an intermediate element 2 are arranged to be joined by means of a handle member 3 to a valve member 4. A fluid line 5 is shown in Fig. 1 attached to either end of the valve device.

The connecting element 1 has a recess 6 for the reception of a pipe or tubing 5 which may be soldered in place to form a tight joint. A central passage 7 extends through the element from the recess 6 and opens into a recess 8 of diameter larger than the passage. The corner at the junction of the passage with the recess constitutes a valve seat 9.

Outside at the mid portion the connecting element is constructed in the form of a nut 10 to supply a wrench hold during assembly or readjustment and a threaded extension 11 forming the outer wall of the recess 8 is adapted to connect with the intermediate element 2. Element 1 therefore performs the office of a separable connecting medium to the fluid line with which the valve device is to be used and in addition carries the seat for the valve on which operation of the device depends.

Intermediate element 2 forming the other part of the body portion of the valve device has a threaded pocket like depression 12 from which a central passage 13 extends forming an aperture through element. The bottom 14 of the depression 12 has an annular shape and acts as a support for a retaining ring 15 where the character of the packing requires it. A packing material 16 of the conventional sort occupies the bottom of the depression and is surmounted by another ring 17. It is preferable that the ring 17 be made of some rigid material of a more or less ductile consistency, because in addition to holding the packing material in place, its function is to form a tight seal against the flat edge of the threaded extension 11 on the connecting element 1 to assist in preventing leakage of fluid from within the valve. At the junction of the face 18 of the ring, with the central hole 19 thereof, a right angle valve seat 20 is formed, the purpose of which will be later described. On the outside the element 2 is constructed in the form of a nut 21 similar to the element 1 to supply a wrench hold.

A skirt portion 22 is provided on the element 2 and midway in the skirt an annular groove 23 is cut to form part of a swivel connection. A sleeve 24 on the left side of the handle 3 surrounds the skirt 22 with a slight clearance so that they may rotate freely with respect to each other and a groove 25, complementary to the groove 23, is cut in the inside wall of the sleeve. When the two grooves thus formed are placed together they form an annular hole in which a wire 27 may be inserted. To supply access to the annular hole, thus formed by the junction of the grooves 23 and 25, a lead hole 26 is drilled through the sleeve 24 from the outside, tangent to the composite annular hole. In forming the swivel joint the wire 27, originally in a straight piece of measured length, is driven through the hole 26. The wire being ductile, finds its own way around the annular hole and fastens the two members together though permitting them to rotate one around the other. There is a slight clearance between the wire and the sides of the grooves, so that there will be no restriction to the free motion of the swivel joint.

At the right of the handle member 3 a rim 28 extends outward to give balance to the device and provide a wall for a depression 29. A knurled circumference at the outer rim 30 of the handle furnishes a commodious hand grip for turning the valve off and on.

Within the handle member is a partition wall 31 which has a hole threaded, preferably with left hand threads, to accommodate the valve member 4 previously referred to. This valve member comprising one of the novel features of the device is composed essentially of a cap or valve element 32 and a connecting element 33 for a tube, joined together by a stem 34. The element 33 is shaped similar to the connecting element 1 at the opposite terminal of the device for solder connection with a pipe or tubing as described previously. That part of the stem 34 immediately adjacent the element 33 is threaded as at 35 with left hand threads to cooperate with the threaded hole of the partition wall 31 in order that a right hand rotation of the handle will translate the valve to the left to a shut-off position. The diameter of the passage 13 in the intermediate element 2 is large enough to permit the threaded portion 35 to slide along within it free from interference, the only point of contact of the stem with the body being the area where it rubs along the packing. The main part of the stem 34 at the left is reduced in cross section and extends as noted, in snug sliding relation through the packing 16 and terminates in the cap or valve 32. A central passage 36 extends entirely through the valve member, opening into the fluid line at the right hand connection.

Near the left hand end of the stem a groove 37 is cut and the end is beveled as at 38 to fit inside the cap 32. A rim 39 is constructed on the cap so that it can be pressed to a loose floating fit into the groove 37. Passages 40 piercing the sloping walls of the cap form a path of minimum resistance for a fluid passing through the valve device.

Valve 32 fits against the seat 9 of the connecting element 1 and, due to the loose floating engagement of the valve with the stem, is permitted to find its own perfect seat and establish a fluid tight closure upon exertion of a very slight pressure.

Immediately to the right of the groove 37 a shoulder 42 is rigidly attached to the stem. The shoulder has a sloping face 41 facing the ring 17 so that when the valve is completely opened to its normal operative position the face 41 bears against the seat 20 on ring 17, forming a seal which is an added assurance against leakage past the packing. This back seating feature is simultaneously a guard against accidental dissembling of the device when the valve is turned completely on.

In operation the valve device is inserted in the fluid line 5 as illustrated in Fig. 1 unsupported by any wall or other stationary object. The line itself serves to support the valve and in turning the valve off or on by means of the handle member 3 the resistance supplied by the line prevents rotation of the other parts of the device. If occasion requires, however, the body may be secured by a hand hold or wrench hold on the element 2. It will be observed that when open, the fluid follows the slope of the cap or valve 32 through the passages 40 without abrupt change in direction and continues then unrestricted through the valve device. When the valve is completely open the packing seal is reinforced by the metal to metal back seat. Very little pressure is necessary to securely close the valve and no strain is placed upon the valve assembly.

What I claim therefore and seek to secure by Letters Patent, is:

1. A valve device for a fluid line comprising a body member including one element connectible at one of its ends with the fluid line and having at the other end an extension, a recess in said extension, and a valve seat at the bottom of said recess; another element having a pocket to engage the extension on the first element, a packing gland at the bottom of said pocket having packing material therein and a ring of rigid material surmounting the packing material, said gland being impressed between said body elements, and a valve member including a floating valve cap and a valve stem, said valve member extending through the pocket and the recess in the body member and encompassed by said packing gland; means for loosely attaching the valve cap to one end of the stem to permit said valve cap to find its own seat when the valve device is closed, means forming a passage for fluid extending through the valve and the stem, a means at the other end of said stem for connecting the device with the fluid line, an annular offset on said valve member cooperable with the ring of rigid material to form a seal to minimize leakage from said valve device when in open position, and a handle member engaging the body member and the valve member for opening and closing the valve device.

2. A valve device for a fluid line comprising at one terminal a connecting element engageable with said line having a passage therethrough and having at one end a threaded extension and a recess of diameter larger than said passage cooperable with the passage to form a valve seat, a valve member including a valve and a stem for said valve, the valve member having a central passage with an entrance at the valve end and an exit at the opposite end, means forming a second terminal for attaching the other end of the valve device to the fluid line, an intermediate element having a central passage for the stem and threaded for engagement with said connecting element, a packing joint between the intermediate element and the connecting element, a handle member having a swivel connection with said intermediate element and threadably engageable with said stem and operable to cause translation of said valve to and away from the seat, and means for limiting the translation of the valve away from the seat; said last means being operable as a reverse seal for said valve device to prevent leaks when in open position.

3. A valve device for a fluid line comprising at one terminal a connecting element for said line having a passage and having at one end a recess cooperable with the passage to form a valve seat, a stem and a valve attached thereto cooperable with said seat, means forming a passage through said stem, means for attaching said stem to the fluid line at the other terminal of the device, an intermediate element having a central passage for the stem, said intermediate element being engageable with the connecting element and forming a joint for packing therebetween, and means rotatable with respect to said elements and threadably engageable with said stem being operable rotatably to move said valve to and away from said seat.

4. A valve device for a fluid line comprising a fixed member connectible in said line, a valve seat, a valve member comprising a stem and a hollow member forming a direct seating valve loosely connected at one end and self-adjusting on said seat and having passages therethrough, means forming a passage through the device and communicating through the valve with the fluid line, means for joining the free end of said valve member directly to the fluid line, the fixed member having an aperture for the accommodation of the stem, packing means to render the space around the stem gas tight, and means for opening and closing said valve.

5. A valve device for a fluid line comprising a member connectible in said line, a valve seat therein, a valve member cooperable with said seat comprising a valve stem and a valve element loosely attached thereto, there being a passage past said valve seat and through said valve element and stem comprising a continuously direct passage for fluid, means on the valve member for joining said member to the fluid line, and means connected with the valve member for opening and closing said valve device.

6. A valve device forming a streamline passage for fluid through a fluid line comprising a body member having a valve seat therein, a valve element including a direct seating valve and a valve stem cooperable with said seat, a handle member engageable with said body member and said valve element operable to move said valve to and away from said seat, said valve being constructed in the form of a hollow floating cap loosely engaging said stem and operable on closing to adjust itself to its own seat, said cap having perforations formed therethrough comprising a portion of said streamline passage.

7. A valve device for a fluid line comprising at one terminal a body member including an elements connectible at one end with the fluid line and having at the other end thereof an extension and a recess in said extension, a valve seat at the bottom of the recess, a second element engaging the extension on said first element having a pocket therein, a packing gland at the junction of said elements and a ring of rigid material surmounting said gland, said gland being pressed into position between said elements, a valve member comprising a valve and valve stem extending through the pocket and the recess and encompassed by said packing gland, a handle member on said body member for opening and closing the valve device, and an annular offset on the valve member facing the ring and operable to seat thereon at full open position.

8. A valve device for a fluid line comprising a body member comprising two sections connectible in said line, a valve seat therein, a valve member comprising a stem and a valve and means forming a central passage through said valve member, one end of said central passage being in communication with the fluid line and the other end being in communication with the valve, said body member having a passage for accommodation of the stem, packing adjustably compressible between the sections of the body member surrounding the stem by movement of one section with relation to the other and means for opening and closing the valve device.

9. A valve device for a fluid line comprising a body portion connectible in said line, a valve seat in the body portion, a valve portion including a stem and a direct seating valve comprising a perforate cap loosely attached to the stem, means including said cap forming a fluid passage through said device, means for connecting the passage with the fluid line, a rotating handle member having an open central aperture encompassing said valve portion, said handle member interconnecting said valve and body portions, and having a swivel engagement with one and a threaded engagement with the other, and operable to effect a relative axial movement between said portions in response to rotation of said handle member.

10. A valve device for a fluid line comprising a body portion connectible in said line, a valve seat, a valve cooperable with said seat for opening and closing the valve device, a valve stem having a passage therethrough, said passage opening into the valve at one end and in direct communication with the fluid line at the other end, a reverse acting valve member on the stem and a reverse acting valve seat located within the body cooperable therewith to seal the device against leaks when in open position, the body portion having an aperture for accommodation of the stem, means providing a gas tight sliding engagement between the body portion and the stem, and means connected with said body portion and attached to the stem for opening and closing said valve.

11. A valve device forming a passage for fluid through a line comprising a body portion connectible in said line, a metallic valve seat therein, a hollow stem forming a portion of the passage and a valve comprising an apertured metallic element forming another portion of the passage cooperable with said seat and attached loosely to the stem so that the valve when moved by the stem into position is free to find its own seat, said stem being connected with the fluid line so that when the valve is open there is a continuously direct passage for fluid through the apertured element and the stem, said body portion having packing secured therein and compressibly adjustable into gas-tight relation with the stem, and a handle element connected with the body and the stem for opening and closing the valve device.

12. A streamline valve device for a fluid line comprising a body portion of two separable concentric sections connected together at the ends, one of said sections being equipped with means for making a connection with the fluid line and provided with a valve seat and a passageway for fluid, a concentric handle member rotatably connected at an end of the other body section forming a continuation of said section and having a central aperture therethrough and a recess at the free end thereof, a valve stem provided with a passage for fluid equivalent in capacity to the passage of the body section and a means thereon for making a connection with the fluid line retractable into the recess, said stem being connected with the handle member and positioned within the central aperture thereof and extending within said body sections, said stem being provided with a valve element at an end thereof cooperable with said valve seat for opening and closing the valve device.

GEORGE E. FRANCK.